May 28, 1968     J. H. CARLSON ET AL     3,385,116

COARSE-FINE CONTROL KNOB ASSEMBLIES

Filed May 23, 1966     2 Sheets-Sheet 1

Inventors
John H. Carlson
Hugh A. Robinson
By their Attorney

Carl E. Johnson.

United States Patent Office

3,385,116
Patented May 28, 1968

3,385,116
COARSE-FINE CONTROL KNOB ASSEMBLIES
John H. Carlson, Danvers, and Hugh A. Robinson, Wenham, Mass., assignors to United Shoe Machinery Corporation, Flemington, N.J., a corporation of New Jersey
Filed May 23, 1966, Ser. No. 552,258
6 Claims. (Cl. 74—10.54)

This invention relates to manually operable means for effecting precise relative rotation of parts. More especially the invention is concerned with the provision of coarse-fine dual control knob assemblies of the general type used, for example, in tuning radio and television sets. It will be understood that the invention is not limited to the particular constructions herein shown and described and which are selected from numerous possible embodiments merely by way of exemplification.

Large quantities of electronic and other devices require means for insuring that tuning and other accurate angular adjustments may be rapidly and conveniently made by hand. Harmonic drive transmissions of the general type disclosed for example in United States Letters Patent No. 2,906,143, issued September 29, 1959, in the name of C. Walton Musser, have hitherto been found advantageous in a wide variety of power applications especially because of their torque capability in relation to their compact size and often because of their characteristic extremely low backlash. Accordingly, as herein illustrated, the present invention preferably employs a harmonic drive type assembly wherein rotary output is manually obtained as a consequence of a circumferential wave of radial deflection being imparted to one of two meshing, differentially toothed members. While known basic harmonic drive transmission elements are utilized, it is a main object of this invention uniquely to mount and adapt them in an improved combination for attaining precision performance in an economical vernier type assembly.

A further object of this invention is to provide a one hand control knob assembly of low cost for making coarse and fine rotary adjustments.

To these ends, and in accordance with a feature of the invention, there is provided in combination a coarse adjusting knob operatively connected in 1:1 ratio to a control shaft projecting from a housing, a flexspline also secured to this shaft, a circular spline grounded to the housing by means of a friction brake, and a fine adjusting knob integral with an internal wave generator cooperative with the flexspline, a reduced output speed of the latter being transmitted to the shaft in consequence of the brake providing friction on the circular spline greater than encountered by the fine adjusting knob with the flexspline. When desired the circular spline may be the output and the flexspline held grounded. In one embodiment shown the coarse adjusting knob is outboard and the fine adjusting knob inboard; the other illustrative embodiment has these parts reversed.

The above and other features of the invention, together with various novel details in construction, will now be more particularly described with reference to the accompanying drawings, in which.

Figure 1:
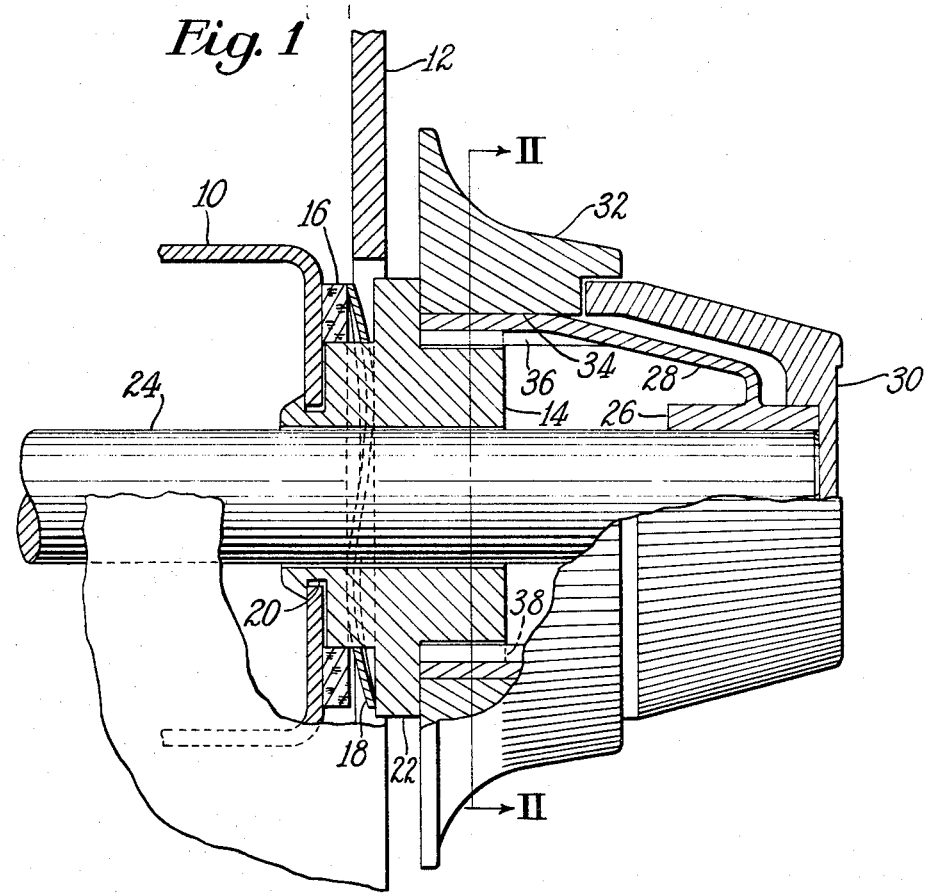
FIG. 1 is a view in side elevation, with a portion broken away, of a coarse-fine control knob assembly for manually rotating a shaft in a housing.

In FIG. 1 a chassis 10 of an apertured cabinet or housing 12 has a circular spline 14 normally grounded thereto by means of a friction brake consisting of a brake ring 16 and a wavy washer 18. For this purpose the chassis 10 is received in an annular groove 20 formed in the circular spline 14, and the perimeter of the washer 18 exerts an axial clamping force between the ring 16 and the chassis. The circular spline 14 is centrally bored coaxially to receive a rotatable shaft 24 to be angularly adjusted but is not affixed to this shaft.

On the outer end of the shaft 24 a cylindrical portion 26 (FIG. 1) of a preferably molded tubular plastic flexspline 28 has a force-fit mounting or other suitable mounting arrangement. For coarse tuning or other quick, approximate angular adjustment of the shaft, a knob 30 is fixedly mounted on the flexspline 28 and accordingly provides a direct 1:1 rotational control of the shaft 24.

Figure 2:
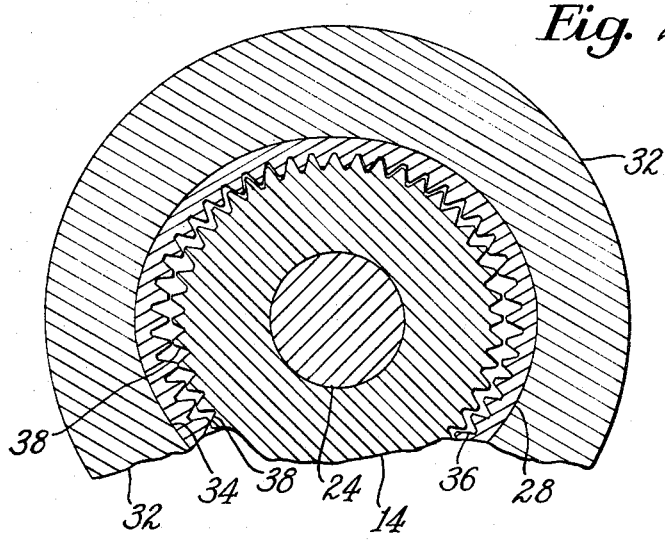
FIG. 2 is a section taken on the line II—II of FIG. 1 and indicating the major axis of the wave generator shape in a fine adjusting knob in horizontal position.

When it is desired to angularly position the shaft 24 with greater refinement, a hollow fine-adjusting knob 32 (FIGS. 1 and 2) is employed as next described. The knob 32 is axially nested between the circular spline collar 22 and the inboard end of the coarse control knob 30 and is formed with an internal wave generator surface 34 (FIG. 2) which in this instance preferably is in the shape of an elliptoid. The internal surface of knob 32 could also be comprised of two pads which form the minor axis of the shape in the flexspline. As best seen in FIG. 2, wherein the major axis of the elliptoid is horizontal, the knob 32 imparts to internal spline teeth 36 on the inboard portion of the flexspline 28 a corresponding elliptoid shape such that, in the locality of the vertical or minor axis the teeth 36 fully mesh with circumferentially opposed external spline teeth 38 formed on the circular spline 14. The circular spline teeth 38, which are less in number than the flexspline teeth 36 by two or a multiple thereof, are fully out of mesh at the major axis.

It will be clear that in operating the knob 30 for rough adjustment of the shaft 24 the brake means 16, 18 is easily overridden and provides no appreciable resistance to knob rotation. When turning the fine control knob 32, however, the circular spline 14 is maintained substantially stationary by the brake means. This is to say, effective friction between the ring 16 and the chassis 10 exceeds that between the wave generator surface 34 of the knob 32 and the smooth exterior of the flexspline 28 and the torque required at shaft 24. Hence rotation of the fine adjusting knob 32 produces output rotation in the flexspline 28 at a considerably lower speed (dependent upon actual tooth differential), and with substantially zero backlash. Since the coarse knob 30 in this arrangement rotates with the flexspline, a mechanical readout on the knob 30 may be used.

Figure 3:
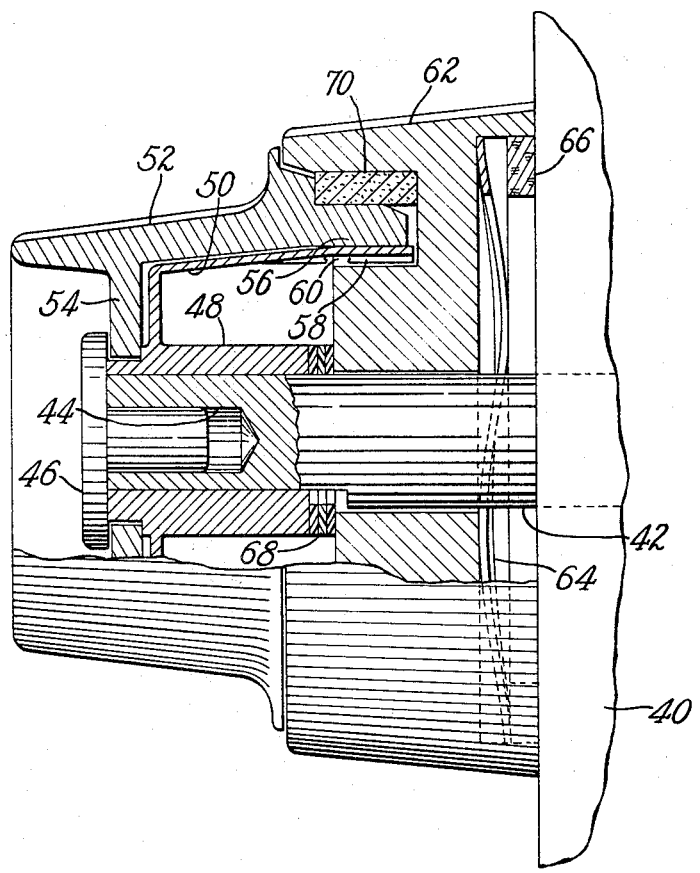
FIG. 3 is a view corresponding to FIG. 1 but showing a modified form of the invention.

Referring to FIG. 3, a modified coarse-fine adjusting knob assembly next to be explained provides for the fine adjusting knob to be outboard. In this alternate arrangement there projects from a panel 40 a shaft 42 to be rotated. The shaft has an axial bore 44 for receiving in press-fit the shank of a headed assembly retainer button 46. Other means, it will be understood, could be used for retaining the parts assembled. The button head axially abuts the outboard end of a cylindrical sleeve 48 of a flexspline 50 secured (as by engaging flats not shown) for rotation with the shaft 42. An outboard fine adjusting knob 52 has a web 54 rotatable in an annular groove formed in the sleeve end 48, and is formed internally with a wave generator surface 56 which preferably is of an elliptoid shape.

In this instance the wave generator 56 effects meshing at spaced circumferential points (at the minor axis) of spline teeth 58 formed internally of the flexspline 50 with external splines 60 (less in number by two or a multiple thereof) formed on a hub of a circular spline 62 which constitutes a coarse-adjusting control knob. The latter is grounded to the housing or panel 40 by a brake wavy washer 64 coacting on a radial face of a brake ring 66, the periphery of the ring frictionally engaging the knob or spline 62. For preloading the wavy washer axially to prevent the coarse knob 62 from turning when the fine adjusting knob 52 is rotated, a plurality of shims 68, which may be of Teflon for instance, are mounted on the shaft 42 between the circular spline or coarse adjusting knob 62 and the flexspline sleeve 48. The number of shims 68 used is selected suitably to modify the friction of the brake 64, 66.

In making coarse angular adjustment of the shaft 42 by turning the knob 62, torque sufficient to overcome the built-in preload of the wavy washer assembly must be applied whereupon the flexspline 50 and the fine knob 52 are rotated together. This preloaded brake means serves to hold the coarse knob or circular spline 62 stationary during operation of the fine adjusting knob 52. Rotation of the latter rotates the major and minor axes of the wave generator shape and hence the corresponding shape in the flexspline 50. Its rotation relative to the circular spline 62 drives the shaft 42 with reduced speed for vernier adjustment and accurate rotational positioning as selected.

Most of the parts of the illustrated construction may be of molded plastic and hence quite inexpensive. In order to keep the co-efficient of friction between the wave generator surface 56 and the flexspline 50 as low as possible, and less than the friction provided by the circumference of the ring 66 with the circular spline, it has been found desirable to make the flexspline 50 of nylon when the circular spline 62 is of a material such as Delrin acetal. In order to prevent dust and dirt from getting into the harmonic drive splines, an annular seal 70 (FIG. 3) which may be of felt is preferably disposed between the coarse adjusting knob 62 and the fine adjusting knob 52. A labyrinth type seal may be incorporated between these members to prevent foreign particles from migrating into the working area. A further distinction in the FIG. 3 structure over that of FIGS. 1, 2, is that the coarse adjusting knob 62 also serves as the circular spline rather than being separate pieces.

The above described embodiments of the invention are selected from among the many possible, and illustrate the few, low cost parts needed for attaining a high degree of precise angular movement when practicing this invention.

Having thus described our invention, what we claim as new and desire to secure by Letters Patent of the United States is:

1. A harmonic drive type dual control knob assembly for angularly adjusting a shaft comprising, in coaxial relation on the shaft, a circular spline freely receiving the shaft, a friction brake for resisting rotation of said circular spline about an axis of the shaft, a tubular flexspline having a spline portion circumferentially meshing at spaced localities of interengagement with the circular spline and another portion drivingly connected to the shaft, the splines of the flexspline exceeding those on the circular spline by two or a multiple thereof, and a fine adjusting knob mounted on said flexspline and formed internally to provide a wave generator for progressing said spaced localities of spline meshing, the frictional resistance to flexspline rotation afforded by said wave generator being less than that provided by said brake to the circular spline, the arrangement being such that the friction brake holds the circular spline against rotation during adjustive rotation of the fine adjusting knob, and the circular spline may be corotated as a coarse adjusting knob with the flexspline to drive the shaft in substantially 1:1 ratio.

2. A control knob assembly as set forth in claim 1 wherein the circular spline is inboard of the shaft, and a coarse adjusting knob is affixed outboard of the shaft for corotation with said flexspline.

3. A dual control assembly as set forth in claim 1 wherein the friction brake consists of a wavy washer and cooperating brake ring.

4. A dual control assembly as set forth in claim 2 wherein the fine adjusting knob is inboard of the shaft with respect to the coarse adjusting knob.

5. The dual control knob assembly as set forth in claim 1 wherein the fine adjusting knob is outboard of the shaft with respect ot the coarse adjusting knob.

6. The control knob assembly as set forth in claim 4 wherein shims are interposed between the flexspline and the coarse adjusting knob for modifying the friction of said brake.

References Cited

UNITED STATES PATENTS

| 1,802,505 | 4/1931 | Griffoul | 74—10.54 |
| 2,658,395 | 11/1953 | Coates | 74—10.52 |

FOREIGN PATENTS 249,805  10/1926  Great Britain.

MILTON KAUFMAN, *Primary Examiner.*